United States Patent [19]

Unland et al.

[11] Patent Number: 4,667,886

[45] Date of Patent: May 26, 1987

[54] METHOD AND APPARATUS FOR THE PRODUCTION OF CEMENT CLINKER WITH A LOW ALKALI CONTENT

[75] Inventors: Georg Unland, Ennigerloh; Günter Driemeier, Lienen, both of Fed. Rep. of Germany

[73] Assignee: Krupp Polysius AG, Beckum, Fed. Rep. of Germany

[21] Appl. No.: 756,445

[22] Filed: Jul. 18, 1985

[30] Foreign Application Priority Data

Aug. 24, 1984 [DE] Fed. Rep. of Germany ....... 3431197

[51] Int. Cl.$^4$ ............................................. B02C 25/00
[52] U.S. Cl. ...................................... 241/23; 241/24; 241/30; 241/33; 241/81; 241/186.3

[58] Field of Search .. ..................... 241/81, 24, 30, 33, 241/23, 73, 21, 186.3, 79, 186 R; 432/13, 61, 32, 41, 48, 43, 45

[56] References Cited

U.S. PATENT DOCUMENTS

| | | | |
|---|---|---|---|
| 1,534,855 | 4/1925 | Lowenthal | 241/81 X |
| 2,375,487 | 5/1945 | Newhouse | 241/24 X |
| 3,075,756 | 1/1963 | Gieskieng | 432/32 |
| 3,524,594 | 8/1970 | Anderson et al. | 241/24 X |
| 3,729,181 | 4/1973 | Itoh et al. | 432/32 |

Primary Examiner—Mark Rosenbaum
Attorney, Agent, or Firm—Learman & McCulloch

[57] ABSTRACT

A method of producing cement clinker with a low alkali content, in which the presence of deposits in the rotary kiln is monitored using measuring techniques and in the event of deposits being present the coarse material above a certain grain size is removed from the system.

6 Claims, 1 Drawing Figure

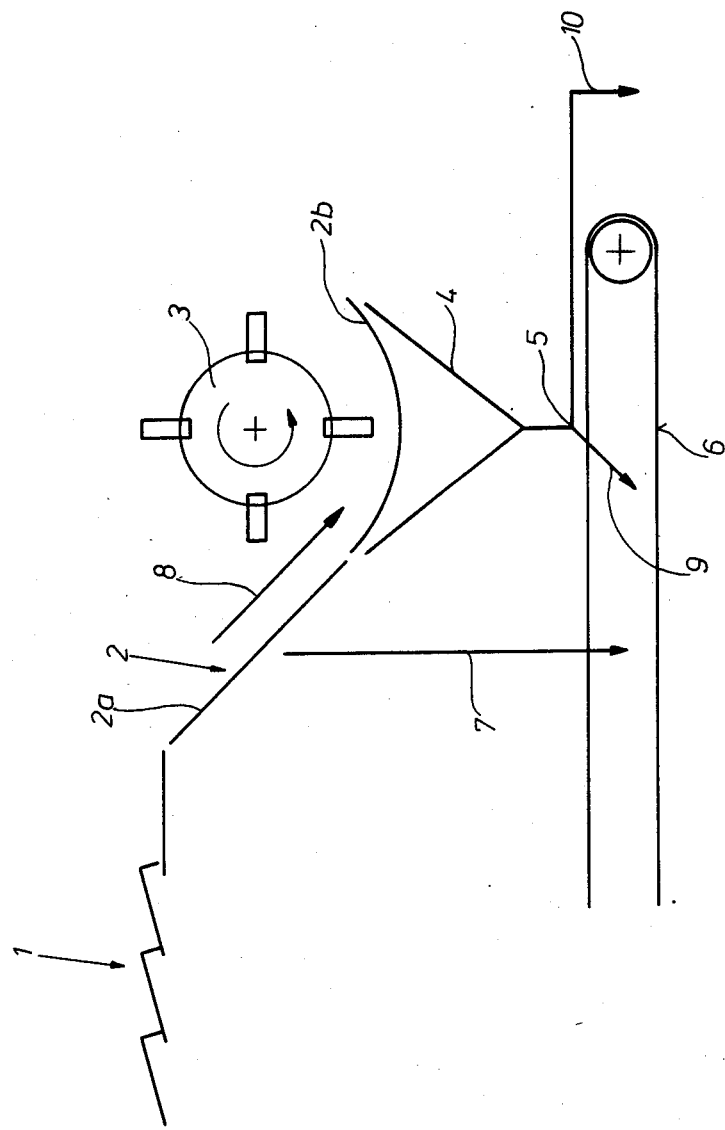

METHOD AND APPARATUS FOR THE PRODUCTION OF CEMENT CLINKER WITH A LOW ALKALI CONTENT

The invention relates to a method and to apparatus for the production of cement clinker with a low alkali content.

The object of the invention is to provide a method which makes it possible to produce cement clinker with a low alkali content in a particularly economic manner and in particular irrespective of a varying content of harmful substances in the raw material.

The invention is based upon the knowledge that when cement clinker is burnt in a rotary kiln the harmful substances contained in the raw material accumulate predominantly in the deposits which build up—mostly in the form of deposit rings—in the rotary kiln. If the deposits building up in the rotary kiln exceed a certain thickness, which can no longer withstand the mechanical and thermal strains, the deposits crumble and become detached (so that there are deposits present) which generally occurs at irregular intervals of time.

In the past these deposits were crushed with the normal clinker in a clinker crusher which is usually located downstream of the cooler and ground to cement in the cement mill. As a result of this, with the conventional process the content of harmful substances in the finished material is subject to considerable fluctuation and at least at times (when there are deposits present) greatly exceeds the values which are permissible in the production of cement clinker with a low alkali content.

The invention makes use of the knowledge that on the one hand the harmful substances (particularly alkalis) preferably accumulate in the deposits and on the other hand the detached deposits (deposits present) have a grain-size distribution which differs markedly from that of the normal clinker: whereas normal clinker generally has a grain size between 0 and approximately 30 mm, the deposits mostly have a greater grain size which as a rule is more than 30 mm.

If measuring techniques are used to monitor the presence of deposits and if when a certain quantity of deposits is present the proportion of the material discharged from the cooler having a grain size above a certain value is removed from the system, then the content of harmful substances (particularly the alkali content) in the finished product can thus be significantly reduced and a more homogeneous composition of the finished products can be ensured even over a long period of time.

In the method according to the invention the material discharged from the cooler is advantageously delivered to a separator which separates out coarse material above a certain grain size. The separation limit of this separator should advantageously be adjustable for adaptation to the grain size of the normal clinker. It will generally be between 50 and 100 mm.

The coarse material above a certain grain size which is separated out by the separator is advantageously delivered to a crusher. In normal operation (without the presence of deposits) the coarse material separated out by the separator and crushed in the crusher is mixed with the fine material passed through the separator and thus forms a component of the finished material. On the other hand, in the event of deposits being present the coarse material which has been separated out by the separator and if required crushed in the crusher is removed from the system. It can either be discarded altogether, put to another use or added to the normal clinker at a later stage when it is not required to produce clinker with a low alkali content.

The presence of deposits is monitored using measuring techniques with the aid of one or more of the following operational values:
pressure in the port of the rotary kiln,
content of $NO_x$, $O_2$ and CO in a preheater, upstream of the rotary kiln,
power consumption of the rotary kiln drive motor,
power consumption of the cooler drive motor,
air pressure below the grate of a grate cooler,
temperature of the exhaust air from a grate cooler.

The presence of deposits is advantageously monitored by a combined determination of several of these operational values. For instance, three measurements could be combined and if two limiting values are exceeded this results in material over a certain grain size being removed from the system.

One embodiment of apparatus for carrying out the method according to the invention is illustrated schematically in the drawing.

Apart from the preheater and the rotary kiln, which are not shown, the apparatus for carrying out the method according to the invention includes a cooler 1, a separator 2 which is connected to the cooler 1 and formed by a skimmer grate 2a and a further grate 2b, comminuting means comprising a crusher 3 and a material deflector 5 which is provided below a chute 4 and only indicated schematically.

The fine proportion (arrow 7) of the material discharged from the cooler 1 falls through the skimmer grate 2a directly onto a drag chain 6. The coarse material (arrow 8) separated out by the separator 2 (skimmer grate 2a and grate 2b) is comminuted by the crusher 3 and passes via the chute 4 and the material deflector 5 either—in normal operation—to the drag chain 6 (arrow 9) as a component of the finished material or—in the event of deposits being present—to be removed from the system (arrow 10).

The measuring means which monitors the presence of deposits in the rotary kiln and controls the material deflector 5 as a function of the measured value is not shown in the drawing.

The method according to the invention can be used in all types of coolers (grate coolers, planet coolers and drum coolers).

In practice the presence of deposits mostly occurs in phases (daily or weekly, but for the most part not strictly periodically). The discarding or separating out of the coarse material only in the event of deposits being present ensures a very economical manner of operation with a constantly low alkali content.

In order to clarify the disclosure it should be pointed out that the content of harmful substances in the clinker should for example be less than 0.6 to 0.65% $Na_2O$, whereas in the deposits the content of harmful substances is frequently more than 30%.

The presence of deposits can be determined using measuring techniques for example by the combination of the following three measurements:
power consumption of the rotary kiln drive motor (when there are deposits present the power consumption of the rotary kiln drive motor increases),
pressure in the port of the rotary kiln (when there are deposits present this pressure frequently increases in sudden bursts), temperature of the exhaust air from the cooler (when there are deposits present this exhaust air temperature rises from between approximately 180° and 230° to over 250° C.).

A combination of these three measurements could switch over the material deflector 5 in order to separate out or discard the deposits for example when two of the limiting values are exceeded.

What is claimed is:

1. In a method of producing low alkali content cement wherein cement clinker is burned in a rotary kiln, cooled in a cooler, and separated into relatively fine and relatively coarse constituents, and wherein the relatively coarse constituents normally are crushed and combined with the relatively fine constituents, and wherein deposits of alkali of relatively large grain size compared to the grain size of low alkali cement clinker adhere to said rotary kiln and periodically become detached therefrom, the improvement comprising monitoring the contents of said kiln to detect the presence therein of alkali deposits detached from said kiln, and diverting the crushed constituents from combination with said relatively fine constituents when the quantity of said alkali deposits in said kiln exceeds a predetermined proportion of clinker in said kiln.

2. The method according to claim 1 wherein the predetermined proportion of clinker in said kiln is variable.

3. The method according to claim 1 wherein said cooler is a grate cooler and wherein the monitoring of the contents of said rotary kiln is effected by observing at least one of the following values:

(a) pressure at the kiln's clinker outlet;
   (b) the content of $NO_x$, $O_2$ and CO in a preheater upstream from said kiln;
   (c) the power consumption of the kiln's drive;
   (d) the power consumption of the cooler's drive;
   (e) the air pressure below the grate of the cooler; and
   (f) the temperature of air exhausted from the cooler.

4. In apparatus for producing low alkali content cement clinker from clinker which is burned in a rotary kiln and passes from said kiln to and through a cooler, and wherein alkali deposits having a grain size greater than a selected value form on said kiln and periodically become detached from said kiln and pass from the latter to and through said cooler, said apparatus including separator means in the path of clinker discharged from said cooler for separating relatively fine clinker constituents from relatively coarse clinker constituents, said apparatus including crushing means for crushing said relatively coarse constituents and means for normally combining the crushed constituents with the relatively fine constituents, the improvement comprising means for diverting the crushed constituents from being combined with the relatively fine constituents in response to the detection of the presence in said kiln of a predetermined quantity of said deposits.

5. Apparatus according to claim 4 wherein the means for separating the relatively fine and relatively coarse constituents comprises a skimmer grate.

6. Apparatus according to claim 5 wherein the diverting means comprises a deflector mounted for movement between two positions in one of which the crushed constituents are directed toward said fine constituents and in the other of which the crushed constituents are directed away from said fine constituents.

* * * * *